(12) United States Patent
Smith

(10) Patent No.: US 7,520,524 B2
(45) Date of Patent: Apr. 21, 2009

(54) GOOSENECK HITCH ASSEMBLY WITH U-SHAPED TOE AND METHOD OF USE

(76) Inventor: Francis V. Smith, P.O. Box 3487, Bozeman, MT (US) 59772

( * ) Notice: Subject to any disclaimer, the term of this patent is extended or adjusted under 35 U.S.C. 154(b) by 336 days.

(21) Appl. No.: 11/302,195

(22) Filed: Dec. 14, 2005

(65) Prior Publication Data

US 2006/0125207 A1    Jun. 15, 2006

Related U.S. Application Data

(60) Provisional application No. 60/636,030, filed on Dec. 15, 2004.

(51) Int. Cl.
    *B60P 1/04* (2006.01)
(52) U.S. Cl. .................. 280/425.2; 414/481
(58) Field of Classification Search .............. 280/425.2, 280/425.1; 414/481
    See application file for complete search history.

(56) References Cited

U.S. PATENT DOCUMENTS

| | | | | |
|---|---|---|---|---|
| 2,590,210 A | * | 3/1952 | Rogers | ........................ 414/481 |
| 3,429,585 A | * | 2/1969 | Ross | ........................ 280/441.2 |
| 5,435,586 A | | 7/1995 | Smith | |
| 6,767,172 B2 | | 7/2004 | French et al. | |
| 6,932,372 B2 | | 8/2005 | French et al. | |

* cited by examiner

*Primary Examiner*—Kevin Hurley
(74) *Attorney, Agent, or Firm*—Clark & Brody

(57) ABSTRACT

A gooseneck hitch assembly adapted for use with a towing vehicle comprises a gooseneck hitch and a u-shaped toe. The u-shaped toe has legs straddling sides of the gooseneck hitch assembly, the legs connected to one or more powered cylinders mounted to the gooseneck assembly. The u-shaped toe also has an enlarged toe end to reduce the bearing pressuring encountered during a hitching operation. The u-shaped toe can include a wear pad mounted to an underside of the toe end to reduce wear during towing use. A wear pad of the bearing plate assembly can further include a beveled surface to accommodate the change in orientation of a free end of the toe during the hitching operation.

18 Claims, 6 Drawing Sheets

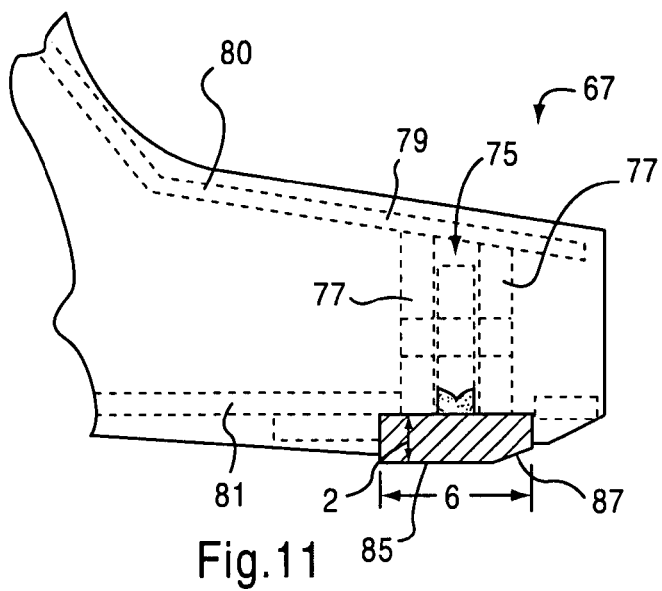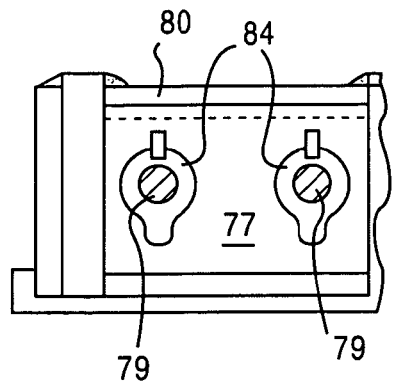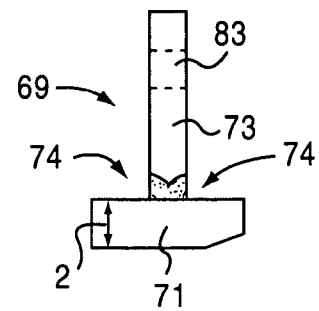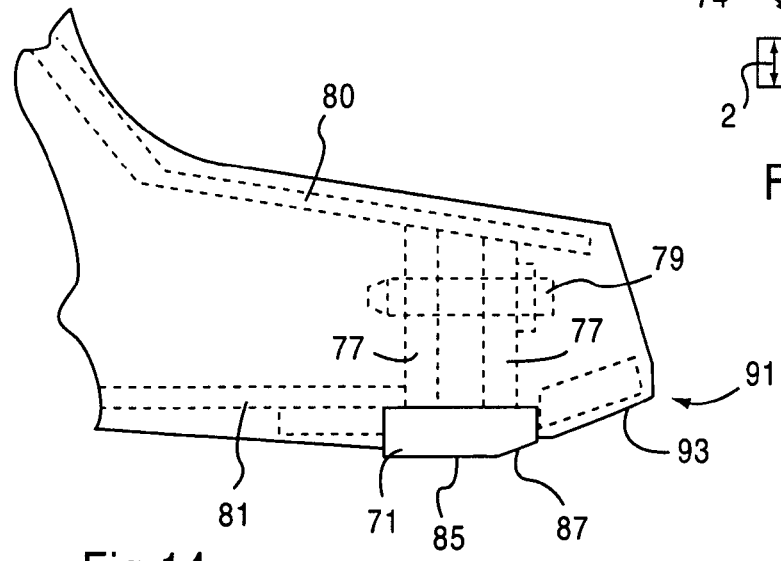

GOOSENECK HITCH ASSEMBLY WITH U-SHAPED TOE AND METHOD OF USE

This application claims priority under 35 USC 119(e) based on provisional patent application Ser. No. 60/636,030 filed on Dec. 15, 2004.

FIELD OF INVENTION

The present invention is directed to an improved gooseneck hitch for hauling trailers and the like, and in particular to a hitch that employs a u-shaped toe that allows for a more robust hitch construction, and an increased load bearing space on the free end of the toe.

BACKGROUND ART

The invention is an advancement in gooseneck hitches that are utilized for towing trailers, especially trailers adapted for carrying heavy equipment. In the prior art, the gooseneck hitches sold by TowHaul of Bozeman MT revolutionized the towing industry. In this hitch, a toe is mounted between a pair of gooseneck plates. One end of the toe is pivotally mounted between the plates, with the other end driven by one or more hydraulic cylinders. With a grab hook of the hitch engaging a trailer latch, the toe is driven by the hydraulic cylinders, the driving of the toe pivoting it and causing an end thereof to engage a portion the trailer. Continued pivoting movement of the toe lifts the trailer up for movement by a towing vehicle supporting the hitch. FIGS. 1 and 2 show top and side views of such a prior art gooseneck hitch 10. Therein, the hitch has sides 1, connected together by a number of web plates 2 positioned in different locations. A coupler shaft 3 connects the hitch 10 to a towing vehicle (not shown). The hitch 10 has a toe 4 that is moved by lift cylinders 5, the lift cylinders mounted at 6 to one end of the toe 4 and the other end to the cylinder box 7 that also functions to connect the sides 1 together. The toe 4 is mounted between sides at shaft 8. This same hitch is shown in U.S. Pat. No. 5,435,586 to Smith, herein incorporated in its entirety by reference.

Because of the size of equipment being transported at present and enormous lifting loads associated therewith, these hitches employ welded web plates interspersed between the gooseneck plates for strength. Because of the tremendous loads, some of the welds can crack, thus causing maintenance issues for gooseneck hitches in the field.

In addition, since a bottom surface of the free end of the toe that contacts the trailer moves along a trailer surface, the bottom surface can wear prematurely, also causing repairs to be made in the field.

Therefore, a need has developed to provide an improved gooseneck hitch for lifting and hauling high tonnage equipment. The present invention solves this problem by using a unique toe design.

Other gooseneck hitches and trailers have been proposed such as that shown in U.S. Pat. No. 6,767,172 and U.S. Pat. No. 6,932,372 to French et al. These documents do not address the problem faced by the inventor nor offer a solution thereto.

SUMMARY OF THE INVENTION

It is a first object of the present invention to provide an improved gooseneck design.

Another object of the present invention is to provide an improved toe design.

Other objects and advantages will become apparent as the description proceeds.

In satisfaction of the foregoing objects and advantages, the present invention is an improvement in gooseneck hitch assemblies designed for lifting trailers. These assemblies typically include opposing gooseneck sides or plates. A toe is provided that has a first end that is pivotally mounted between the opposing gooseneck sides at lower ends thereof. The toe has a second end connected to one or more powered cylinders, the cylinders mounted to the gooseneck sides. The toe has a third end adapted for lifting heavy equipment. The invention improves this type of a hitch by providing a u-shaped toe with a toe center portion and opposing toe legs. The toe center portion has the third end for lifting, with ends of the opposing legs functioning as the second end or pivot point to allow for toe movement with respect to the gooseneck sides.

The gooseneck hitch assembly can also include a removable wear pad that is adapted to attach to the third end of the toe, with the toe pad extending from an underside of the third end for contact with a vehicle that is to be lifted. Preferably, the wear pad surface intended for contact with the vehicle has a main or first wear surface and a second wear surface. The second wear surface is beveled with respect to the first surface to better accommodate the movement encountered during lifting.

While the toe can be mounted to the gooseneck sides in any fashion, a preferred attachment employs a toe coupler shaft that extends through the gooseneck sides and is attached to the second end of the toe. A vehicle coupler shaft can also be employed at an end of the gooseneck sides for mounting this end to a towing vehicle. The coupler shafts are adapted to be removable from the gooseneck sides. When employing the vehicle coupler shaft for supporting the connection end of the gooseneck sides, a wear saddle can be utilized. The wear saddle is shaped to receive and support the vehicle coupler shaft.

The invention also entails a method of lifting a vehicle such as a trailer using the improved gooseneck hitch assembly. In this method, a portion of the hitch engages or hitches to the vehicle being towed. The toe is pivoted such that the toe underside engages the target vehicle to be lifted. Continued movement of the toe against the vehicle causes the gooseneck hitch to elevate. Since the vehicle is hitched to the gooseneck, the vehicle is also lifted with the gooseneck, thus leaving the vehicle ready for towing by the towing vehicle having the gooseneck hitch assembly.

BRIEF DESCRIPTION OF THE DRAWINGS

FIG. 11 shows an enlarged side view of the toe.

FIG. 12 shows a front view of the enlarged toe.

FIG. 13 shows a side view of the wear plate.

FIG. 14 shows a side view of another toe embodiment.

DESCRIPTION OF THE PREFERRED EMBODIMENTS

The present invention offers significant advantages in the field of towing vehicles, and especially the lifting and towing of low load trailers such as found in the mining industry. Prior art gooseneck hitch assemblies suffer from the inability to accommodate the ever-increasing lifting loads that comes with the advances in new and improved mining equipment. These excessive loads cause a number of problems with prior art hitches in terms of maintenance, reliability, and the like.

The present invention overcomes many of the problems encountered in present day hitches by modifying the toe design of the gooseneck hitch assembly. In the prior art hitch assemblies, the toe typically sits between the side plates of the gooseneck hitch assembly. This necessarily limits the capacity of the toe. The invention overcomes this problem by utilization of a u-shaped toe that has a center portion of increased dimension and opposing legs that pivotally attach to the gooseneck hitch sides for toe movement. The expanded center portion is capable of handling increased lifting loads.

The present invention also improves the prior art toe design by the use of a wear pad that is designed to be linked to an underside of the toe. The wear pad can be part of a bearing pad assembly that receives the brunt of the wear action during towing. The wear pad is easily changed when excessively worn, and the presence of the pad removes the wear normally found on the toe itself in prior art designs.

The invention also provides an improved gooseneck hitch design via the use of shafts that interconnect the hitch sides, and provide the basis for pivoting connection of the hitch assembly to a towing vehicle, pivoting support for the toe itself, and support of cylinders controlling toe movement.

Figure 5:
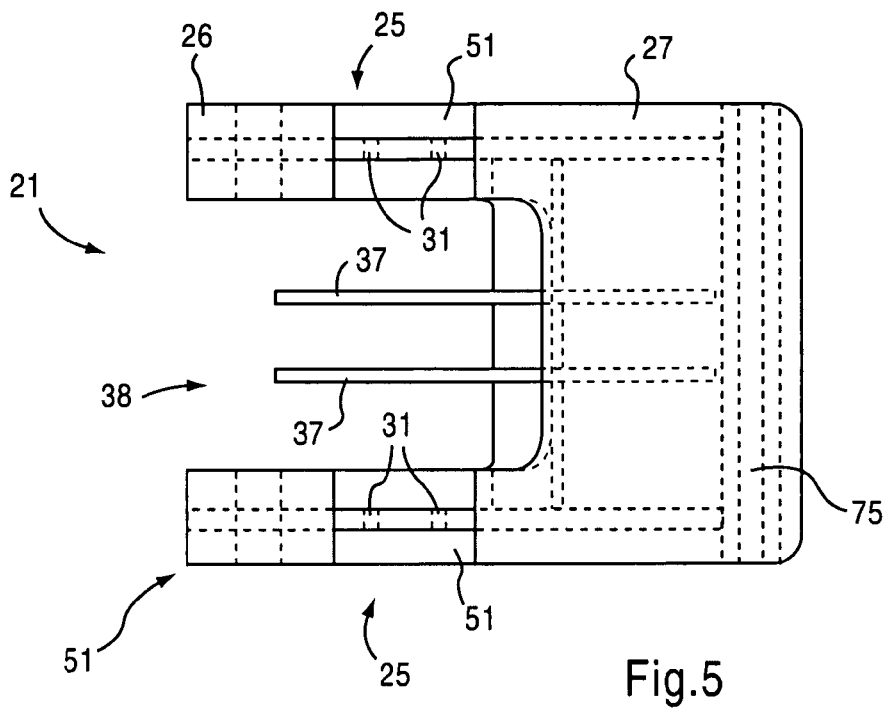
FIG. 5 shows a top view of the toe of FIG. 3.
Figure 6:
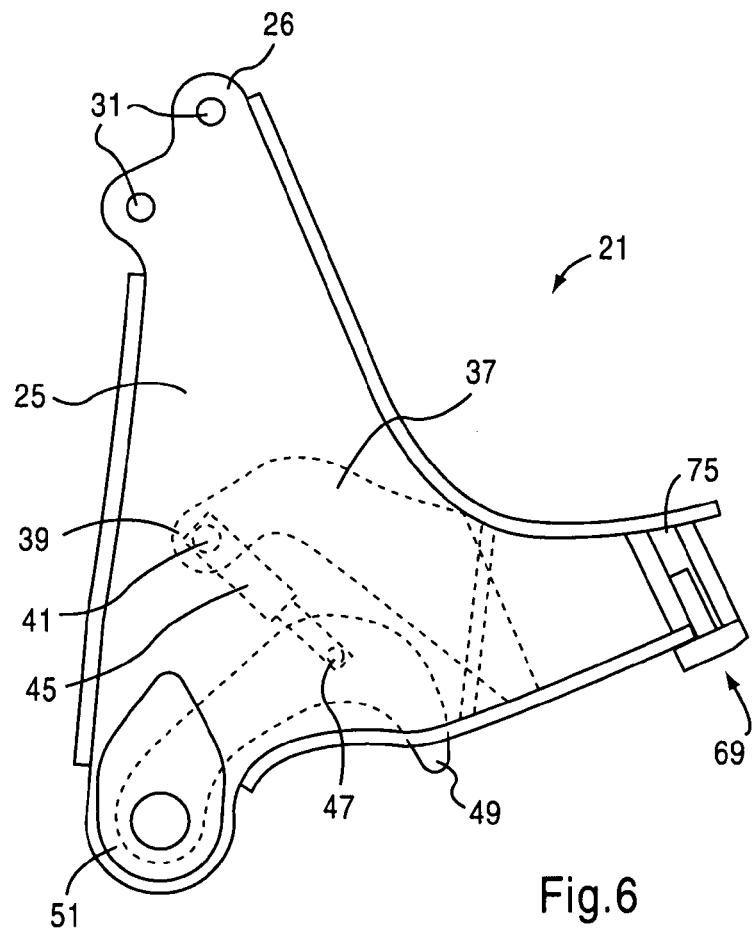
FIG. 6 shows a side view of the toe of FIG. 3.
Figure 7:
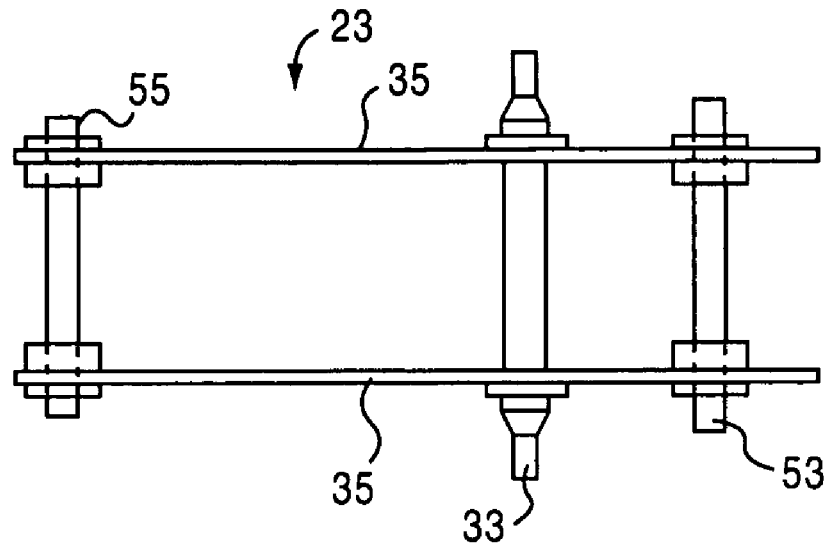
FIG. 7 shows a top view of the gooseneck assembly of the hitch without web plates.
Figure 8:
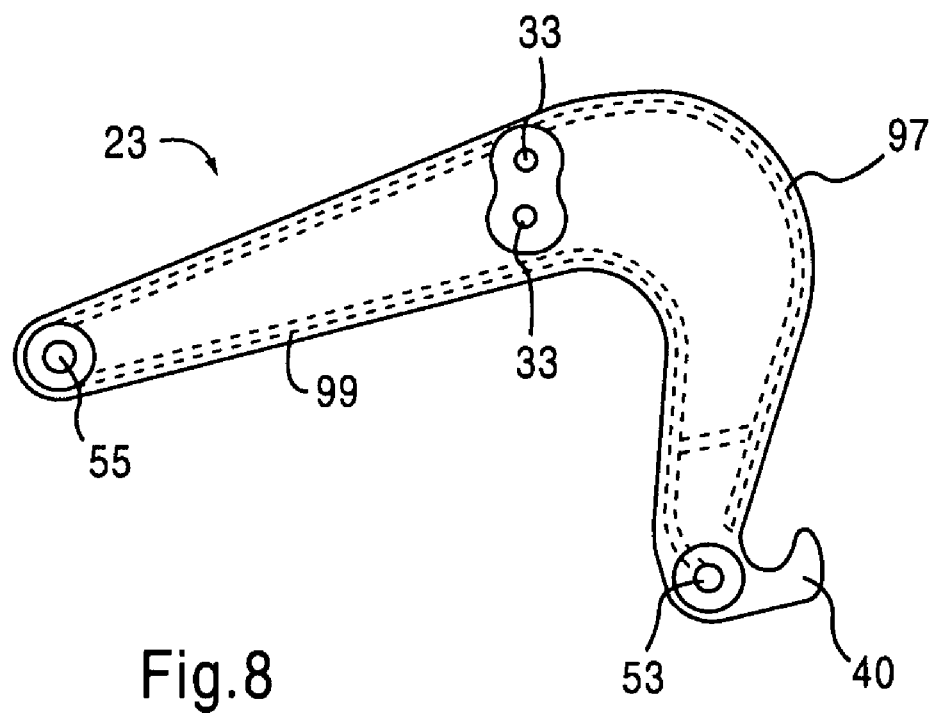
FIG. 8 shows a side view of the gooseneck assembly of the hitch with the web plates shown in cross-hatch.

Referring now to FIGS. 3-8, one embodiment of a gooseneck hitch assembly (shown in FIGS. 3 and 4) is designated by the reference numeral 20, and is seen to include a u-shaped toe 21, see FIGS. 5 and 6, and a gooseneck assembly 23, see FIGS. 7 and 8.

The u-shaped toe (hereinafter toe), has a pair of legs 25 connected by a center portion 27. A second end 26 of each leg 25 is adapted to connect to one or more powered cylinders 29 by openings 31. In the illustrated embodiment, a pair of cylinders are shown, but one or more than two could be employed depending on the towing/lifting need of the hitch. Ends of the cylinders 29 are mounted on a pair of cylinder mounting shafts 33 that extend through the opposing plates 35 that make up the gooseneck hitch assembly 23. The shafts 33 can be removable or integrally attached to the plates 35, with removable shafts being preferred for maintenance. This mounting is far superior to the cylinder box mounting shown in FIG. 1. Spherical bushings are preferred for mounting the cylinders to the shafts 33, although the mounting and/or removable attachment capability between the shafts and the gooseneck plates and cylinder ends can be any type known in the art. Also, the powered cylinders can be any type, but a preferred type includes hydraulically-powered cylinders.

With reference to FIGS. 5 and 6, the toe also has a pair of arms 37 that extend within the space 38 created by the legs 25. The arms 37, via a shaft 41 extending between the arm ends 39, support one end a hydraulic cylinder 45, with the other end 47 of the cylinder linked to a grab hook 49. A description of the grab hook and its function in connection with the hitch portion 40 of the gooseneck, see FIG. 8, is disclosed in the aforementioned Smith patent, and more detail herein is not necessary for understanding of the invention.

A first or lower end 51 of the toe 21 is coupled to the gooseneck assembly 23 via a toe coupler shaft 53, see FIGS. 7 and 8. As with shaft 33, the shaft 53 extends through the gooseneck plates 35 to create a more robust support for the toe end 51. As with shaft 33, shaft 53 can be made removable, similar to shaft 33.

Figure 10A:
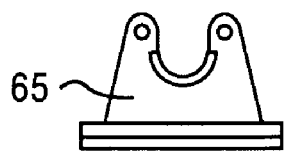
FIG. 10 show a replaceable wear saddle for the coupling shaft of the hitch.
Figure 10B:
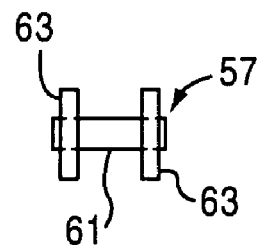
Figure 10C:
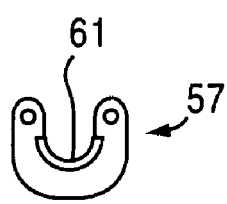

The gooseneck assembly 23 has a vehicle coupler shaft 55 which is attached to the plates 35 in same manner as shafts 33 and 53. The coupler shaft 55 links the gooseneck assembly 23 to a towing vehicle as is known in the art. Referring to FIG. 10, the shaft 55 can be used with a replaceable wear saddle 57, which is designed to contact the shaft portion 59 shown in FIG. 3. The wear saddle 57 includes a semi-cylindrical wear plate 61 held between two opposing supports 63, the supports being adapted to interface with the coupler shaft support 65 that would be mounted to the towing vehicle (not shown). Also not shown are the typical overarms found on prior art towing vehicles that extend from the towing vehicle and over the top of the coupling shaft 55. The overarms prevent the shaft 53 from bouncing out of the wear saddle plate 61 during travel, and leave a clearance between the arms and the shaft to allow the shaft to rock during hitch rotation. The wear saddle plate 61 can be made of any wear resistant material. Of course, the wear saddle 57 is optional, and the toe of the invention could employ the standard support used in the prior art.

The center portion 27 of the toe 21 functions in the same manner as the toe shown in the Smith patent. However, because of the u-shaped configuration, the load bearing area is increased by virtue of the fact that the center portion 27 extends beyond the width of the gooseneck assembly 23, and is supported on its ends via the cylinders 29 and legs 25. This results in lower bearing pressures on the center portion during use.

Figure 9:
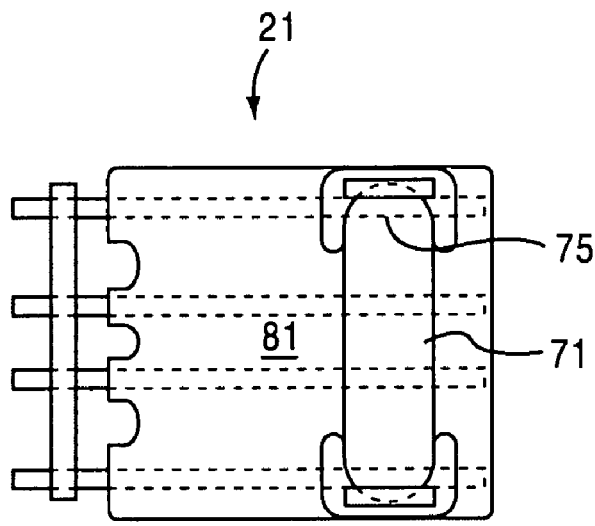
FIG. 9 shows a bottom view of the toe of FIGS. 5 and 6.

The center portion 27 is also equipped, if so desired, with a wear or bearing plate assembly 67 as shown in FIGS. 11-14. The bearing plate assembly 67 includes a wear or bearing pad 69 made up of a wear pad portion 71 and a plate 73 extending from the pad portion 71, and welded thereto at 74. The center portion 27 is formed with a slot 75 created by opposing plates 77, the plates 77 extending between an upper plate 80 of the center portion 27 and a lower plate 81 (see FIG. 9) of the center portion 27. The opposing plates 77 have aligned openings 84, and the plate 73 of the bearing toe pad 69 has similar openings 83. A pair of pins 79 are provided, the pins 79 adapted to retain the plate 73 in the slot 75 so as to retain the bearing pad 69 in position. If desired, the openings 84 could be sized to accommodate spacers or other features to allow for vertical adjustment of the pins 79 so that the vertical displacement of the plate 73 can be altered or lowered to account for wear of the bearing pad 69. For example, the openings 84 could be made larger than the openings 83 in the plate 73, and spacers or the like could be used to position the pins 79 in the appropriate position to situate the pad 71 correctly. Of course, other adjustment mechanisms could be employed, or the bearing pad 69 could have a fixed arrangement, with the worn bearing pad 69 merely replaced with a new one. Similarly, other means could be employed to position a removable wear pad on the underside 81 of the center portion 27 for contact with a trailer or other vehicle being lifted and towed. For example, the wear pad could merely be bolted to the underside 81, and removed and replaced when worn.

The pad portion 71 is designed, if so desired, with a bevel to form first and second wear surfaces 85 and 87. In use of the hitch, the beveled surface 87 makes the first contact with a trailer surface. As described above, when the pad portion 71 makes an initial contact with the trailer, it moves a certain distance before it fully seats on the trailer. The toe 21 also changes its orientation from this initial contact position where surface 87 contacts the trailer to a fully seated position where surface 85 is in contact with the trailer surface. The presence of the beveled surface 87 allows the pad to have an increased contact surface during the initial contact and movement with the trailer, followed by the larger surface 85 contacting the trailer during the lifting operation. The bearing plate assembly 67 also provides a significant advantage in that the toe underside 81 is protected from abrasion and wear during the hitching operation. Instead of repairing the toe after numerous hitchings, only the bearing pad 69 of the bearing plate assembly 67 needs to be replaced.

In conjunction with the formation of the bevel in the bearing pad 69, the toe free end or third end 91 can also have a bevel 93 which aligns with the bevel of the surface 87 of the pad 71. This further facilitates the initial contact of the toe with the trailer during the hitching operation.

Figure 1:
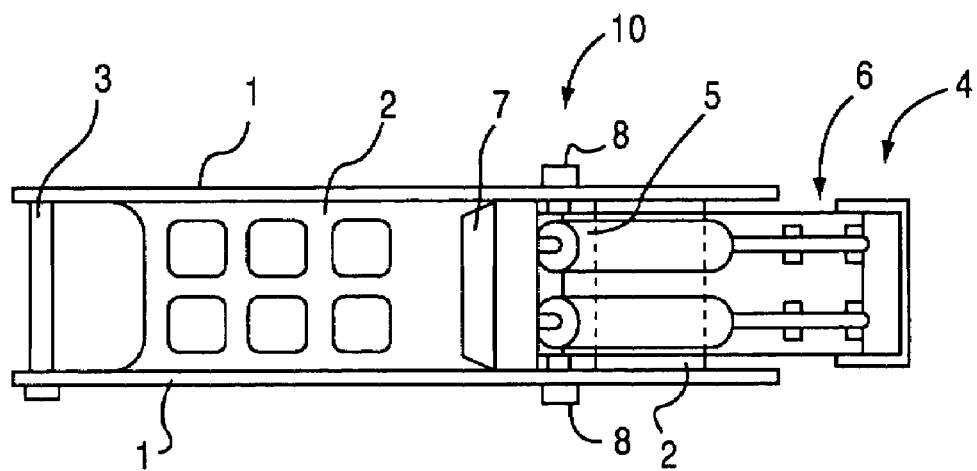
FIGS. 1 and 2 show top and side views of a prior art gooseneck hitch.
Figure 2:
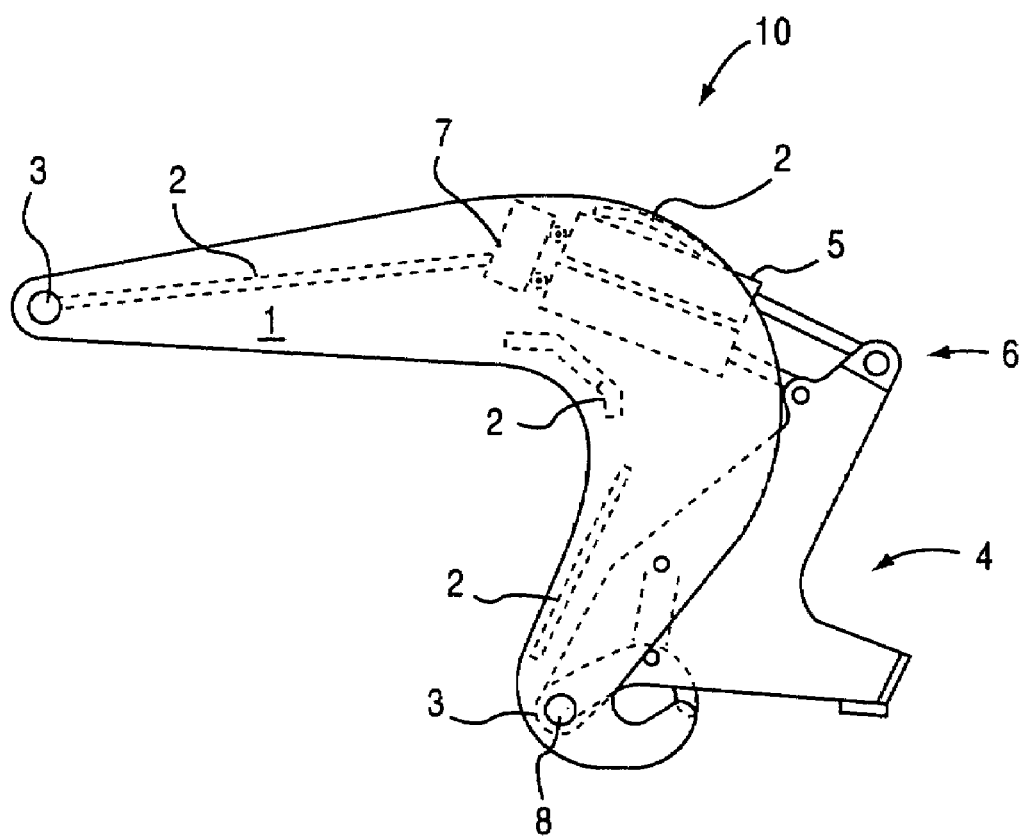
Figure 3:
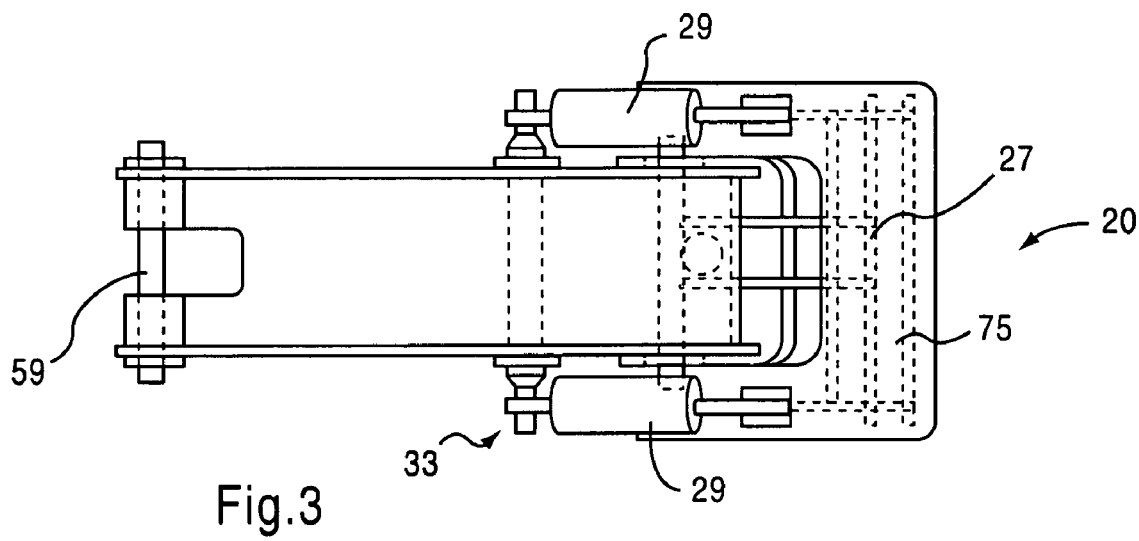
FIGS. 3 and 4 show top and side views of a gooseneck hitch with a new toe design.
Figure 4:
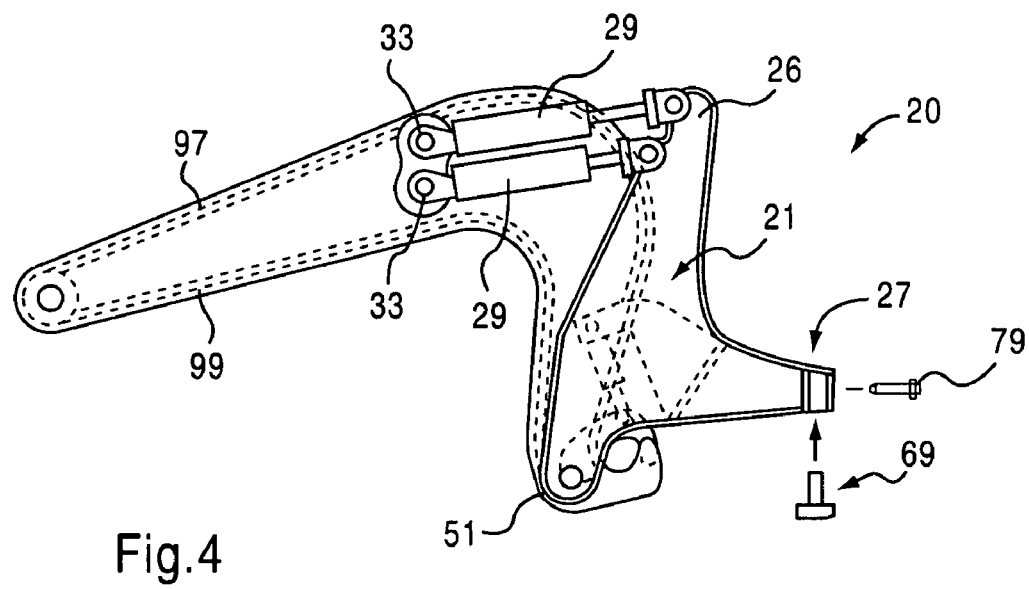

The use of the u-shaped toe 21 provides a significant advantage over the design shown in FIGS. 1 and 2. In the prior art design, a number of differently located web plates 3 are welded at various locations on the gooseneck assembly and between or amongst various components. Because of the disjointed nature of this support, the web plates could be subjected to cracking at the welded joints interconnecting them to the gooseneck plates 5. Providing the u-shaped toe allows webbing, shown in cross hatch as 97 and 99 in FIG. 8 to extend virtually along the entire length of the gooseneck, thus creating a box-like construction for the gooseneck. The upper webbing 97 will have one or more openings to accommodate the legs 37 of the toe 21 that interface with the grab hook 49.

Another significant advantage of the invention is the ability to mount the cylinders, the gooseneck hitch and the lower end of the toe using shafts that extend through the gooseneck plates, see FIG. 7. This provides a more robust hitch, and removes the problems with the cracking associated with the web plates and the problems with the cylinder box of the prior art noted above. In addition, by giving the toe a u-shape, the cylinders 29 are located on the outside of the gooseneck, thus making them easier to maintain. The u-shaped toe 21 is also easier to manufacture than the prior art toe shown in the Smith patent, the attachment of the various shafts being and boxing of the sides simplified.

The gooseneck hitch assembly can be used in any way known in the art, and particularly for lifting low boy trailers and other vehicles as disclosed in the Smith patent. Also, it can be used in connection with any type of a towing vehicle capable of supporting the hitch in its intended manner.

As such, an invention has been disclosed in terms of preferred embodiments thereof which fulfills each and every one of the objects of the present invention as set forth above and provides a new and improved gooseneck hitch and toe and method of use.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. In a gooseneck hitch assembly for towing trailers wherein a gooseneck has a toe comprising:
a first end pivotally mounted to opposing gooseneck sides at a lower end thereof;
a second end connected to one or more powered cylinders, the cylinders mounted to the gooseneck sides;
and a third end adapted for lifting heavy equipment;
the improvement further comprising a u-shaped toe with a toe center portion containing the third end, and opposing toe legs straddling the gooseneck sides, each end of the toe legs being linked to one or more of the powered cylinders.

2. The assembly of claim 1, further comprising a removable wear assembly with a wear pad, the removable wear assembly attached to the third end of the toe, with the wear pad extending from an underside of the third end to contact a portion of a vehicle being lifted by the gooseneck assembly.

3. The assembly of claim 2, wherein the wear pad has first and second wear surfaces, the second wear surface beveled with respect to the first surface.

4. The assembly of claim 3, wherein a portion of an underside surface of the third end of the toe is generally aligned with the beveled second surface of the wear pad.

5. The assembly of claim 1, wherein the first end of the toe is attached to the gooseneck hitch assembly via a toe coupler shaft that extends though the gooseneck sides.

6. The assembly of claim 2, wherein the second end of the toe is attached to the gooseneck hitch assembly via a toe coupler shaft that extends through the gooseneck sides.

7. The assembly of claim 1, further comprising a vehicle coupler shaft mounted through the sides of the gooseneck at a connection end thereof and adapted to be supported by a towing vehicle.

8. The assembly of claim 2, further comprising a vehicle coupler shaft mounted through the sides of the gooseneck at a connection end thereof and adapted to be supported by a towing vehicle.

9. The assembly of claim 5, further comprising a vehicle coupler shaft mounted through the sides of the gooseneck at a connection end thereof and adapted to be supported by a towing vehicle.

10. The assembly of claim 7, further comprising a wear saddle surrounding a portion of the vehicle coupler shaft and supported by a towing vehicle.

11. The assembly of claim 1, wherein each powered cylinder is mounted to the gooseneck sides via a cylinder mounting shaft that extends through the gooseneck sides.

12. The assembly of claim 2, wherein each powered cylinder is mounted to the gooseneck sides via a cylinder mounting shaft that extends through the gooseneck sides.

13. The assembly of claim 5, wherein each powered cylinder is mounted to the gooseneck sides via a cylinder mounting shaft that extends through the gooseneck sides.

14. The assembly of claim 9, wherein each powered cylinder is mounted to the gooseneck sides via a cylinder mounting shaft that extends through the gooseneck sides.

15. The assembly of claim 5, wherein the toe coupler shaft mounted to the gooseneck sides is removable.

16. The assembly of claim 6, wherein the toe coupler shaft mounted to the gooseneck sides is removable.

17. The assembly of claim 11, wherein the cylinder mounting shaft mounted to the gooseneck sides is removable.

18. In a method of lifting a hauling vehicle using a gooseneck hitch and a pivoting toe, wherein a portion of the gooseneck hitches to the hauling vehicle, and pivoting of the toe and toe engagement with the hauling vehicle raises the hauling vehicle for movement, the improvement comprising using the gooseneck hitch of claim 1 for said hitching and lifting.

* * * * *